(12) United States Patent
Yang et al.

(10) Patent No.: US 10,073,957 B2
(45) Date of Patent: Sep. 11, 2018

(54) METHOD AND TERMINAL DEVICE FOR PROTECTING APPLICATION PROGRAM

(71) Applicant: Xiaomi Inc., Beijing (CN)

(72) Inventors: Liang Yang, Beijing (CN); Wenlin Wang, Beijing (CN); Yuzhen Wan, Beijing (CN)

(73) Assignee: XIAOMI INC., Haidian District, Beijing ( * ) Notice: Subject to any disclaimer, the term of this patent is extended or adjusted under 35 U.S.C. 154(b) by 0 days.

(21) Appl. No.: 14/340,534

(22) Filed: Jul. 24, 2014

(65) Prior Publication Data

US 2015/0121543 A1  Apr. 30, 2015

Related U.S. Application Data

(63) Continuation of application No. PCT/CN2014/077402, filed on May 13, 2014.

(30) Foreign Application Priority Data

Oct. 31, 2013  (CN) .......................... 2013 1 0533866

(51) Int. Cl.
*G06F 21/00* (2013.01)
*G06F 21/12* (2013.01)
(Continued)

(52) U.S. Cl.
CPC ............ *G06F 21/121* (2013.01); *G06F 21/51* (2013.01); *H04L 63/101* (2013.01); *H04M 1/66* (2013.01);
(Continued)

(58) Field of Classification Search
CPC .................................. G06F 21/31; G06F 21/10
(Continued)

(56) References Cited

U.S. PATENT DOCUMENTS

2002/0066022 A1* 5/2002 Calder ................. G06F 21/121
726/26
2005/0182964 A1* 8/2005 Jooste ..................... G06F 21/53
726/22
(Continued)

FOREIGN PATENT DOCUMENTS

CA        2762091 A1    6/2012
CN      101828162 A    9/2010
(Continued)

OTHER PUBLICATIONS

"International Search Report for PCT/CN2014/077402".
"European Search Report for 14189116.8-1870".

*Primary Examiner* — Anthony D Brown
(74) *Attorney, Agent, or Firm* — Jun He Law Offices P.C.; James J. Zhu

(57) ABSTRACT

The present disclosure relates to a method for protecting an application program in a terminal device, and a terminal device thereof. The method includes: intercepting a request for starting an application program; determining whether the application program needs protection; and starting a protection interface before starting the application program, if the application needs protection. According to the present disclosure, the protection interface is launched before starting the application program when the terminal device detects that the application program needs protection, thereby protecting the application program comprehensively and thoroughly.

9 Claims, 12 Drawing Sheets

(51) Int. Cl.
  *G06F 21/51* (2013.01)
  *H04L 29/06* (2006.01)
  *H04W 4/00* (2018.01)
  *H04M 1/66* (2006.01)
  *H04M 1/725* (2006.01)

(52) U.S. Cl.
  CPC ......... *H04M 1/72577* (2013.01); *H04W 4/00* (2013.01); *G06F 2221/2141* (2013.01); *G06F 2221/2149* (2013.01)

(58) Field of Classification Search
  USPC ...................................................... 726/26–30
  See application file for complete search history.

(56) References Cited

U.S. PATENT DOCUMENTS

| | | |
|---|---|---|
| 2007/0043838 A1 | 2/2007 | Litteaut et al. |
| 2010/0024020 A1 | 1/2010 | Baugher et al. |
| 2012/0079110 A1 | 3/2012 | Brown et al. |
| 2012/0079586 A1 | 3/2012 | Brown et al. |
| 2012/0173997 A1 | 7/2012 | Schwerdtfeger et al. |
| 2012/0246731 A1* | 9/2012 | Blaisdell ................ G06F 21/53 726/26 |
| 2013/0047117 A1 | 2/2013 | Deutsch et al. |

FOREIGN PATENT DOCUMENTS

| | | |
|---|---|---|
| CN | 101853363 A | 10/2010 |
| CN | 102081722 A | 6/2011 |
| CN | 102566927 A | 7/2012 |
| CN | 102830920 A | 12/2012 |
| CN | 103229183 A | 7/2013 |
| CN | 103366107 A | 10/2013 |
| EP | 2629480 A2 | 8/2013 |
| JP | 2000010773 A | 1/2000 |
| JP | 2003244065 A | 8/2003 |
| JP | 2009271619 A | 11/2009 |
| RU | 2370888 C1 | 10/2009 |
| WO | 2008/127905 A2 | 10/2008 |

\* cited by examiner

| Verification List ||
|---|---|
| Name of Application Program | Whether Pass Verification |
| Short Message | ✓ |
| Game Cat | ✗ |
| Net TV | ✗ |
| Photo | ✓ |
| X Lei Player | ✗ |
| Music Listening | ✓ |

Fig.8

METHOD AND TERMINAL DEVICE FOR PROTECTING APPLICATION PROGRAM

CROSS REFERENCE TO RELATED APPLICATION

The present disclosure is a Continuation of International Application No. PCT/CN2014/077402, filed May 13, 2014, which is based upon and claims priority to Chinese Patent Application No. 201310533866.4, filed on Oct. 31, 2013, the entire contents of which are incorporated herein by reference.

TECHNICAL FIELD

The present disclosure relates to the field of network technology, and more particularly, to a method for protecting an application program in a terminal device and the terminal device thereof.

BACKGROUND

With the development of electronic technology, digital products, such as mobile phones, are more and more widely used in various aspects of life and work. Various application programs of mobile phones often store private contents that the users are not willing to disclose to others. Therefore, there is a need to protect the application programs.

According to the current technology, application programs are generally protected by a system detecting the system booting logs or the running application programs circularly. When the system detects that a running application program needs protection, a password-protected interface is launched to cover the user interface of the protected application program. The user interface of the application program is displayed only upon receiving of a password corresponding to the password-protected interface, thereby protecting the application program.

However, under the current technology, when the password-protected interface is launched to cover the interface of the protected application program, the protected application program has already been started. As a result, information in the application program might be leaked by ways of playing sound or the like.

SUMMARY

Accordingly, the present disclosure provides a method for protecting an application program, including: intercepting a request for starting an application program; determining whether the application program needs protection; and starting a protection interface before starting the application program, if the application needs protection.

According to a second aspect of embodiments of the present disclosure, there is provided a terminal device for protecting an application program, the terminal device including: one or more processors; a memory; and one or more instruction modules stored in the memory and configured to be executed by the one or more processors, the one or more instruction modules comprising instructions for: intercepting a request for starting an application program; determining whether the application program needs protection; and starting a protection interface before starting the application program, if the application program needs protection.

According to a third aspect of the embodiments, the present disclosure provides a non-transitory readable storage medium including instructions, executable by a processor in a terminal device, for performing the method for protecting an application program, the method comprising: intercepting a request for starting an application program; determining whether the application program needs protection; and starting a protection interface before starting the application program, if the application needs protection.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 8 is a diagram illustrating an implementation involved in a method for protecting an application program, according to an exemplary embodiment of the present disclosure;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The embodiments of the present disclosure provide a method, an apparatus and a terminal device for protecting an application program, the detailed descriptions of which are provided below in conjunction with the drawings.

Figure 1:
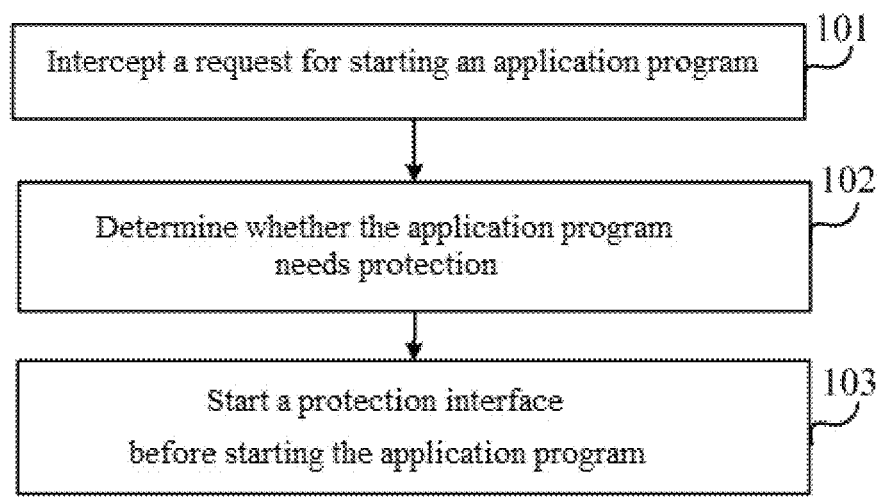
FIG. 1 is a flow chart collectively illustrating a method for protecting an application program, according to an exemplary embodiment of the present disclosure.

Referring to FIG. 1, which is a flow chart collectively illustrating a method for protecting an application program according to an exemplary embodiment of the present disclosure, the present embodiment is described in the case where the method for protecting the application program is applied in a terminal device that can run the application program. The method for protecting the application program includes the following steps.

In step 101, a request for starting an application program is intercepted.

The terminal device intercepts the request for starting the application program. Herein after, the application program can also be referred as "the application program to be started" and the request for starting the application program can be abbreviated as "the start request" or "the request".

In step 102, whether the application program to be started needs protection is determined upon receiving the request.

The terminal device determines whether the application program to be started needs protection after receiving the request.

In step 103, a protection interface is started before starting the application program before starting the application program, if the application program to be started needs protection.

The terminal device starts the protection interface if the application program to be started needs protection.

In sum, according to the method for protecting the application program provided by an embodiment of the present disclosure, the application program is well protected by intercepting a request for starting the application program, determining whether the application program to be started needs protection, and starting a protection interface if the determined result is that the application program to be started needs protection. Therefore, the present disclosure solves the following problem: the protected application program has already been running when the protection interface is started, thereby information in the protected application program might be leaked by ways of playing sound or the like. Accordingly, the present disclosure achieves the technical effects of directly starting a protection interface but not starting the application program when determining that the application program to be started needs protection, and starting the application program only after the protection interface is released, thereby to protect information of the application program comprehensively and thoroughly.

Figure 2:
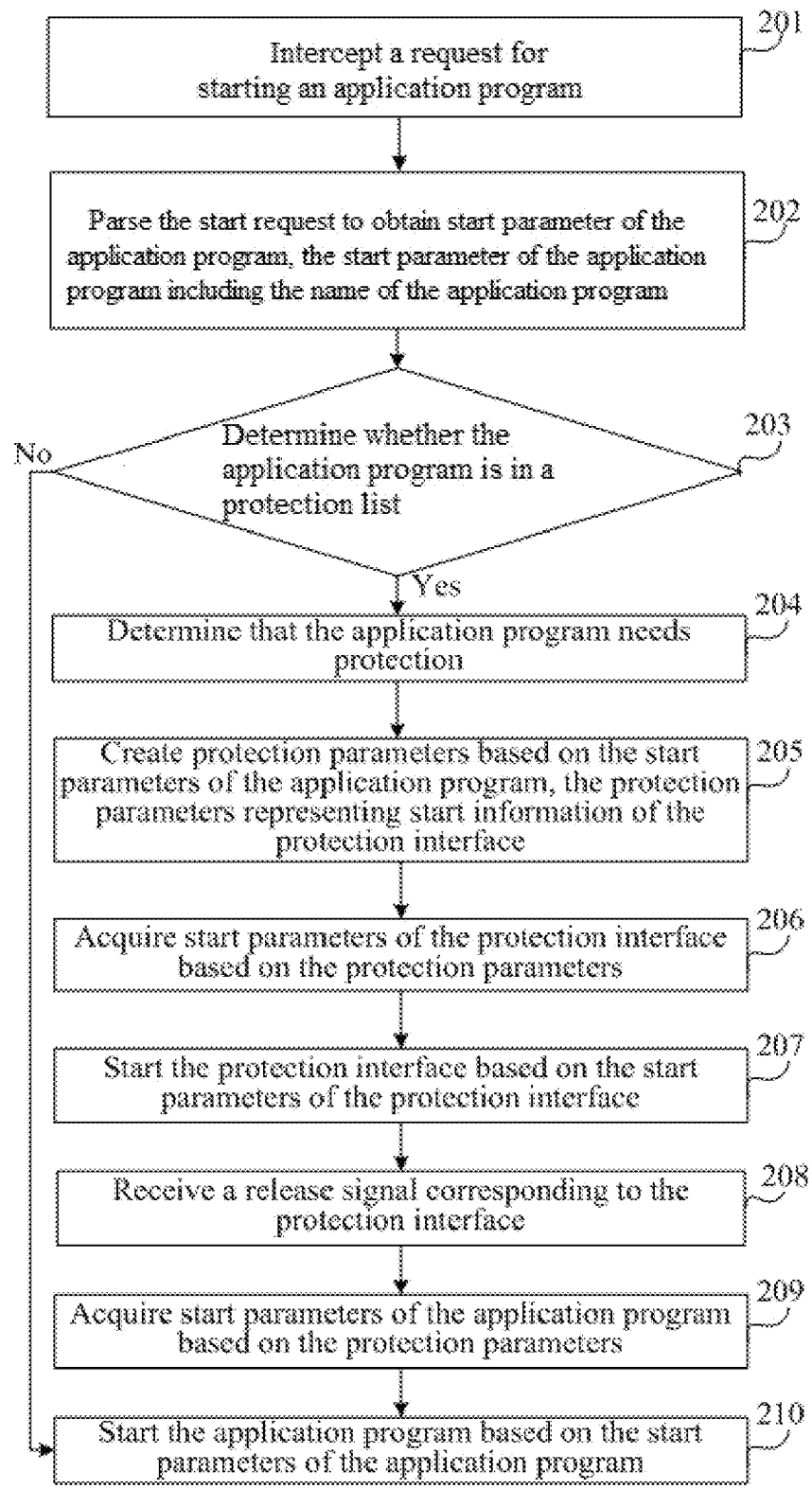
FIG. 2 is a diagram illustrating an implementation involved in a method for protecting an application program, according to an exemplary embodiment of the present disclosure.

Referring to FIG. 2, which is a flow chart illustrating a method for protecting an application program according to another exemplary embodiment of the present disclosure, the present embodiment is described in the case where the method for protecting the application program is applied in a terminal device that can run the application program. The method for protecting the application program includes the following steps.

In step 201, a request for starting an application program is intercepted.

Figure 3:
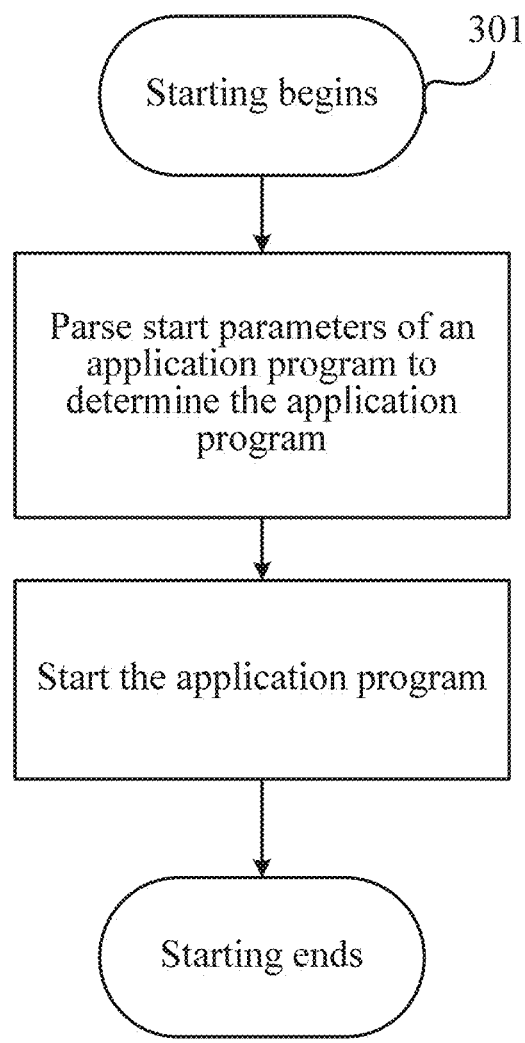
FIG. 3 is a flow chart illustrating a method for protecting an application program, according to an exemplary embodiment of the present disclosure.

In order to intercept a request for starting the application program, please refer to FIG. 3 which illustrates a general process for starting an application program. As illustrated in FIG. 3, when the terminal device is started, the terminal device receives a starting request which carries a start parameter of the application program. Then the start parameter of the application program is parsed to identify the application program. Finally, the application program is started, and the whole starting process ends. In the present disclosure, the start parameter may include one or more parameters necessary for starting the application program.

In the present embodiment, at the stage of "301 starting begins" in the above starting process of the application program, the terminal device intercepts the request for starting the application program, and then, if it is determined later that the application program needs protection, the start parameter of the application program are replaced by protection parameter related to the protection interface for protecting the application, which will be described in detail hereinafter.

In step 202, the start request is parsed to obtain start parameter of the application program, the start parameter of the application program including the name of the application program.

The terminal device parses start parameter in the intercepted start request, the start parameter of the application program including the name of the application program.

It is assumed that the name of the application program obtained by parsing the start parameter of the application program is "X Lei Player".

In step 203, whether the application program is in a protection list is determined based on the name of the application program.

The protection list is a list of application programs to be protected. The terminal device queries whether the application program exists in the protection list based on the name of the application program.

Figure 4:
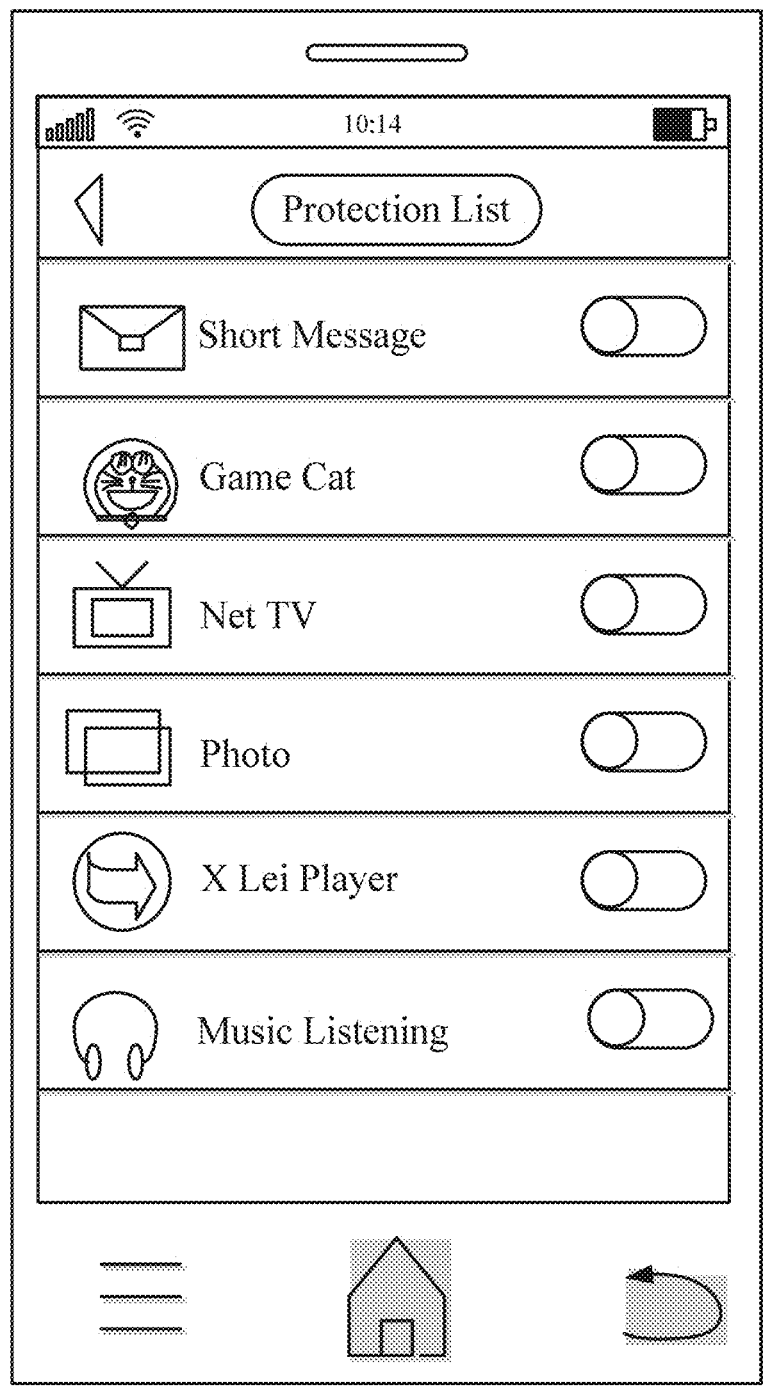
FIG. 4 is a diagram illustrating an implementation involved in a method for protecting an application program, according to an exemplary embodiment of the present disclosure.

For example, please refer to FIG. 4, the user selects application programs to be protected in advance, and adds the application programs to be protected into the protection list. In FIG. 4, the application programs to be protected include a short message, a game cat, a net TV, a photo, an X Lei Player, and a Music Listening.

If the determined result is that the application program is in the protection list, the procedure proceeds to step 204.

If the determined result is that the application program is not in the protection list, the procedure proceeds to step 210.

In step 204, it is determined that the application program needs protection.

If the determined result is that the application program is in the protection list, the terminal device determines that the application program needs protection.

For example, based on the name "X Lei Player" of the application program obtained in step 202, the terminal device queries in the protection list that the application program needs protection, then determines that "X Lei Player" is the application program that needs protection.

In step 205, a protection parameter is created based on the start parameter of the application program. In the present disclosure, the protection parameter includes one or more parameters created based on the start parameter.

After determining that the application program needs protection, the terminal device takes the start parameter of the application program as one part of the protection parameter, and takes predefined start parameter for configuring protection interfaces as the other part of the protection parameter, so as to obtain the protection parameter.

It is to be noted that, the predefined start parameter for configuring protection interfaces include information such as display contents of the protection interface.

In step 206, start parameter of the protection interface are acquired based on the protection parameter.

The terminal device parses the protection parameter, so as to obtain the start parameter corresponding to the protection interface of the application program.

In step 207, the protection interface is started based on the acquired start parameter of the protection interface.

The terminal starts the protection interface based on the start parameter of the protection interface acquired by the parsing.

Figure 5:
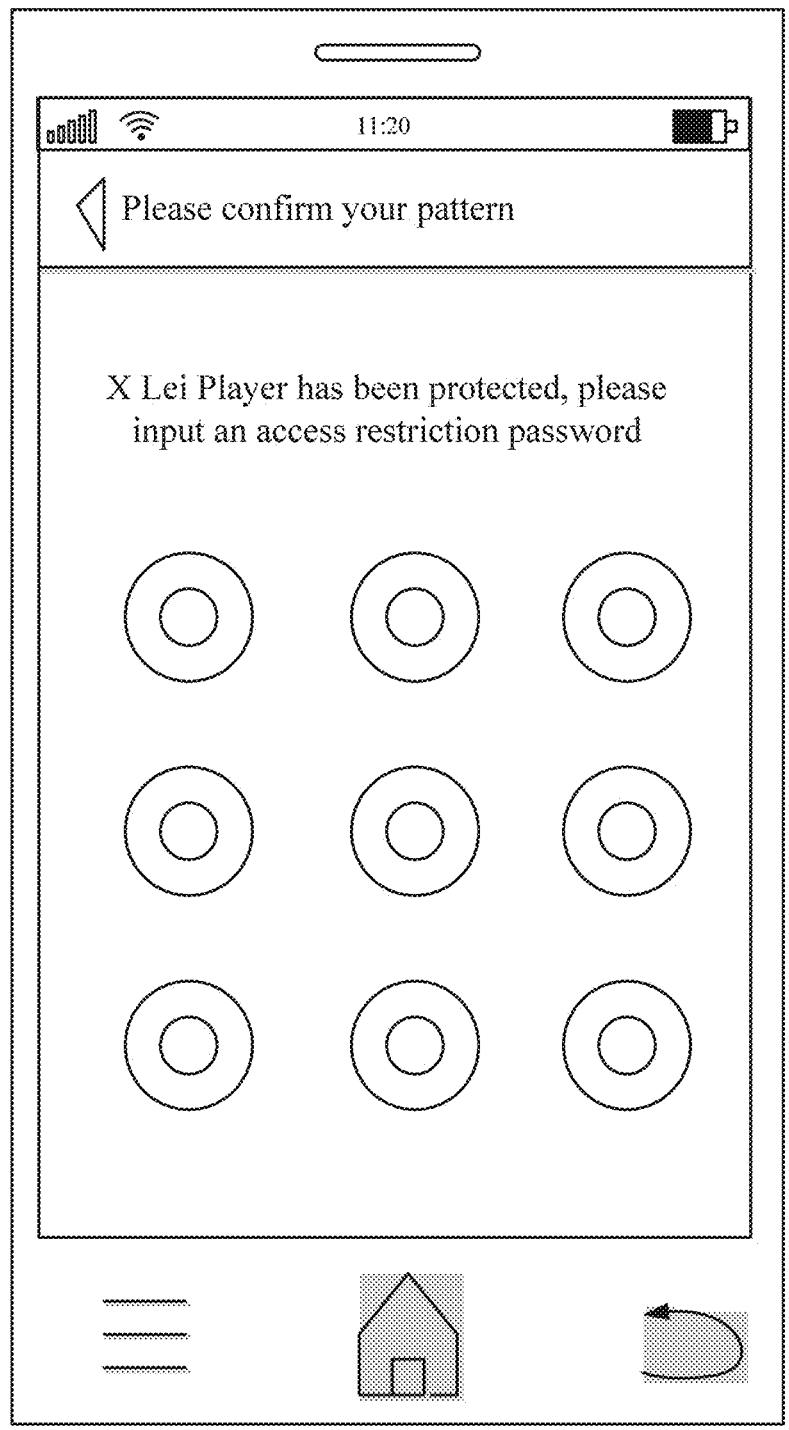
FIG. 5 is a diagram illustrating an implementation involved in a method for protecting an application program, according to an exemplary embodiment of the present disclosure.

For example, refer to FIG. 5, the terminal device starts the protection interface.

It is to be noted that, the embodiment of the present disclosure is exemplified by taking the nine-grid lock screen pattern shown in FIG. 5 as the protection interface, and the pattern of the protection interface is not limited to FIG. 5.

In step 208, a release signal corresponding to the protection interface is received.

After displaying the protection interface, the terminal device releases the protection interface and starts the application program only after receiving the release signal corresponding to the protection interface. The release signal is used to release the protection interface.

For example, after the terminal device displays the protection interface shown in FIG. 5, the user is required to input a preset access restriction password, which is the release signal for releasing the protection interface. The terminal device releases the protection interface and starts the application program to display the user interface of the application program only after receiving a correct access restriction password. It is assumed that the access restriction password of the "X Lei Player" preset by the user is a pattern shown in FIG. 6.

In step 209, start parameter of the application program are acquired based on the protection parameter.

After receiving the release signal, the terminal device detects whether the release signal corresponds to the protection interface. If it is detected that the release signal corresponds to the protection interface, the terminal device acquires the start parameter of the application program from the protection parameter.

Figure 6:
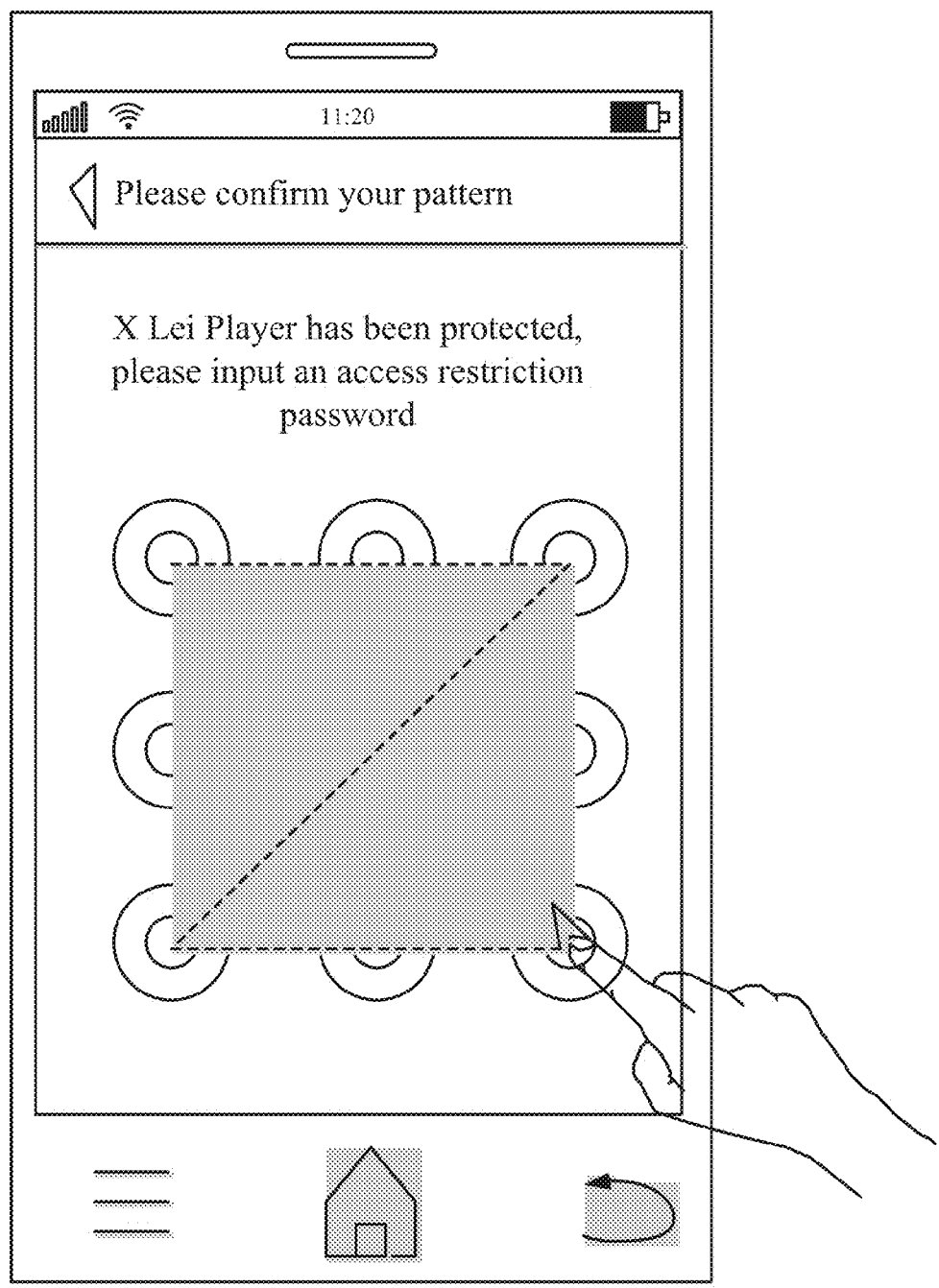
FIG. 6 is a diagram illustrating an implementation involved in a method for protecting an application program, according to an exemplary embodiment of the present disclosure.

For example, after the user inputs the pattern shown in FIG. 6, the terminal device detects whether the pattern corresponds to the protection interface; and after detecting that the pattern corresponds to the protection interface, the terminal device acquires start information of the application program to be started by the start signal from the protection parameter.

In step 210, the application program is started based on the start parameter of the application program.

The terminal device starts the application program to be started based on the start parameter of the application program.

For example, after receiving the pattern input by the user as shown in FIG. 6, the terminal device releases the protection interface, starts the "X Lei Player" based on the start parameter of the application program, and displays a play interface of the "X Lei Player".

In sum, according to the method for protecting the application program provided by an embodiment of the present disclosure, the application program is well protected by intercepting a request for starting an application program, parsing the start parameter in the request to determine the application program, querying the application program in a protection list, determining that the application program needs protection if the application program is queried in the protection list, creating protection parameter based on start parameter of the application program (the protection parameter further including start parameter of the protection interface), and starting the application program after receiving a release signal corresponding to the protection interface.

Therefore, the present disclosure solves the following problem: the protected application program has already been running when the protection interface is started, thereby information in the protected application program might be leaked by ways of playing sound or the like is solved. Accordingly, the present disclosure may achieve the technical effects of: directly starting a protection interface before starting the application program to be started when detecting that the application program needs protection, and starting the application program only after the protection interface is released, thereby to protect information of the application program comprehensively and thoroughly.

In order to not input the release signal each time when a user starts the same application program for several times, the embodiment of the present disclosure further provides the following method for protecting an application program.

Figure 7:
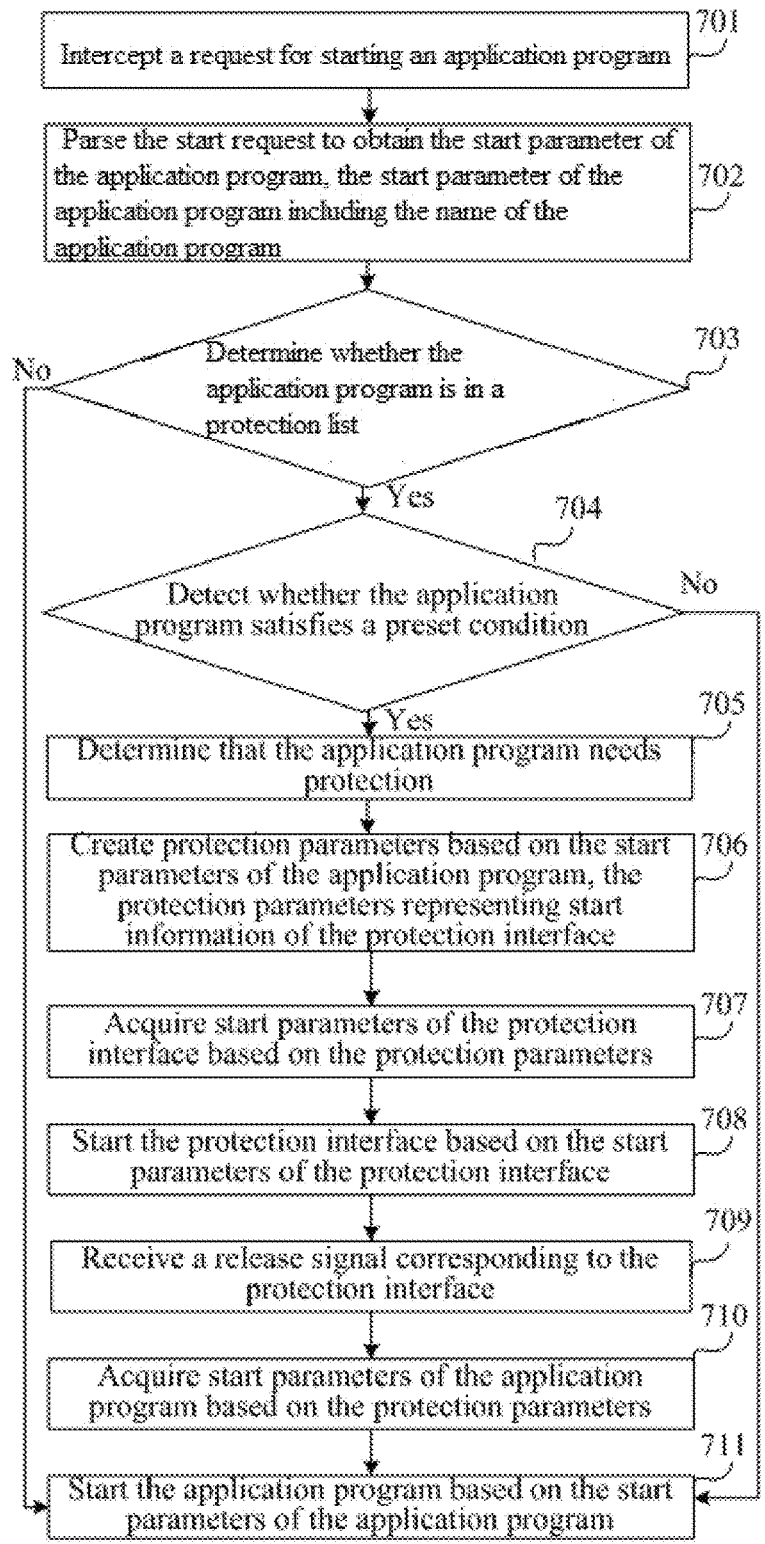
FIG. 7 is a flow chart illustrating a method for protecting an application program, according to an exemplary embodiment of the present disclosure.

Please refer to FIG. 7, which is a flow chart illustrating a method for protecting an application program according to another exemplary embodiment of the present disclosure. The present embodiment is described in the case where the method for protecting the application program is applied in a terminal device that can run the application program. The method for protecting the application program includes the following steps.

In step 701, a request for starting an application program is intercepted.

In order to intercept the request for starting the application program, please refer to FIG. 3 which illustrates a general process for starting an application program. Referring to FIG. 3, when the starting begins, the terminal device receives a starting request which carries start parameter of the application program. Next, the start parameter of the application program is parsed to determine the application program. Then the application program is started, and the whole starting process ends.

In the present embodiment, at the stage of "301 starting begins" in the above starting process of the application program, the terminal intercepts the starting request, and then, if it is determined later that the application program needs protection, the start parameter of the application program are replaced by protection parameter related to the protection interface for protecting the application, which will be described in detail hereinafter.

In step 702, the start request is parsed to obtain the start parameter of the application program, the start parameter of the application program including the name of the application program.

The terminal device parses the start request to obtain the start parameter, the start parameter of the application program including the name of the application program.

It is assumed that the name of the application program obtained by parsing the start parameter of the application program is "X Lei Player".

In step 703, whether the application program is in a protection list is determined based on the name of the application program.

The protection list is a list of application programs to be protected. The terminal device queries whether the application program exists in the protection list based on the name of the application program.

After the stage of "302 parse start parameter to determine the application program to be started" in FIG. 3, the terminal device determines whether the application program is in the protection list based on the name of the application program.

For example, please refer to FIG. 4, the user selects application programs to be protected in advance, and adds the application programs to be protected into the protection list. In FIG. 4, the application programs to be protected include a short message, a game cat, a net TV, a photo, an X Lei Player, and a Music Listening.

If the determined result is that the application program is in the protection list, the procedure proceeds to step 704.

If the determined result is that the application program is not in the protection list, the procedure proceeds to step 711.

In step 704, whether the application program satisfies a preset condition is determined.

If the determined result is that the application program is in the protection list, the terminal device determines whether the application program satisfies the preset condition.

The preset condition includes any one of the followings: 1) the application program has never been started; 2) after last start of the application program, a screen of a terminal device on which the application program runs has been turned off; 3) after the last start of the application program, the terminal device on which the application program runs has been restarted; and 4) a time interval between the last start and current start of the application program exceeds a preset value.

For example, the terminal device determines that "X Lei Player" is in the protection list shown in FIG. 4, then the terminal device determines any one of the followings: 1) whether "X Lei Player" is started for the first time; 2) after last start of "X Lei Player", whether a screen of the terminal device has been turned off; 3) after the last start of "X Lei Player", whether the terminal device has been restarted; 4) a time interval between the last start and current start of "X Lei Player" exceeds a preset value.

To facilitate determining whether the application program satisfies the above preset condition, the terminal device may set a verification list, as shown in FIG. 8. The verification list is used to record whether the application program to be protected satisfies the preset condition: when the application program is started for one time, "√" is marked in the column "whether pass verification"; after the application program is started, if the screen of the terminal device is turned off, or the terminal device is restarted, or a predetermined period of time (which may be assumed as 24 hours) elapses after the starting, then "√" in the column "whether pass verification" is modified as "x".

When determining whether a certain application program satisfies the preset condition, the terminal may just need to detect the mark in the column "whether pass verification" corresponding to the application program.

If the column "whether pass verification" corresponding to the application program is marked with "√", it means that the application program satisfies all of the followings: 1) the application program has been started; 2) after the starting, the screen of the terminal device has never been turned off; 3) the terminal has never been restarted, and 4) the time period that elapses after last start does not exceed 24 hours. Then, when the application program is started again, the application program can be directly started without starting the protection interface again, which is regarded as not satisfying the preset condition.

If the column "whether pass verification" corresponding to the application program is marked with "x", it means that the application program conforms to one of the following conditions:1) the application program has never been started; 2) after last start of the application program, a screen of a terminal device on which the application program runs has been turned off; 3) after the last start of the application program, the terminal device on which the application program runs has been restarted; and 4) a time interval between the last start and current start of the application program exceeds a preset value.

Then, when the application program is to be started, the protection interface needs to be started, and the application program is started only after receiving a release signal corresponding to the protection interface, which is regarded as satisfying the preset condition. In other words, when any one of the above four conditions is satisfied, it is determined that the protection interface needs to be started before starting the application program.

It is to be noted that, the above process for establishing the verification list is an implementation method for determining whether the application program satisfies the preset conditions, which is used to exemplify the present embodiment, but does not limit the present disclosure.

If the determined result is that the application program satisfies the preset condition, the procedure proceeds to step 705.

If the determined result is that the application program does not satisfy the preset condition, the procedure proceeds to step 711.

In step 705, it is determined that the application program needs protection.

If the determined result is that the application program satisfies the preset condition, the terminal device determines that the application program needs protection.

For example, the determined result of step 704 is that the application program named "X Lei Player" satisfies the preset condition, the terminal device determines that "X Lei Player" is the application program that needs protection.

It can be known by referring to FIG. 8 that, if the application program to be started is "short message", although the application program "short message" is in the protection list, it does not satisfy the preset condition, then it is not necessary to start the protection interface, and the step of parsing start parameter of the application program to start the application program may be directly performed.

In step 706, the protection parameter is created based on the start parameter of the application program, the protection parameter being used to represent start information of the protection interface.

After determining that the application program needs protection, the terminal device takes the start parameter of the application program as one part of protection parameter, and takes predefined start parameter for configuring protection interfaces as the other part of the protection parameter, so as to obtain the protection parameter.

It is to be noted that, the predefined start parameter for configuring the protection interfaces include information such as display contents of the protection interface.

In step 707, start parameter of the protection interface are acquired based on the protection parameter.

The terminal device parses the protection parameter, so as to obtain the start parameter corresponding to the protection interface of the application program.

In step 708, the protection interface is started based on the start parameter of the protection interface.

The terminal device starts the protection interface based on the start parameter of the protection interface acquired by parsing.

For example, referring to FIG. 5, the terminal device starts the protection interface.

It is to be noted that, the embodiment of the present disclosure is exemplified by taking the nine-grid lock screen pattern shown in FIG. 5 as the protection interface. The pattern of the protection interface is not limited to FIG. 5.

In step 709, a release signal corresponding to the protection interface is received.

After displaying the protection interface, the terminal device releases the protection interface and starts the application program only after receiving the release signal corresponding to the protection interface. The release signal is used to release the protection interface.

For example, after the terminal device displays the protection interface shown in FIG. 5, the user is required to input a preset access restriction password, which is the release signal for releasing the protection interface. The terminal device releases the protection interface and starts the application program to display the user interface of the application program only after receiving a correct access restriction password. It is assumed that the access restriction password of the "X Lei Player" preset by the user is the pattern shown in FIG. 6.

In step 710, start parameter of the application program are acquired based on the protection parameter.

After receiving the release signal, the terminal device determines whether the release signal corresponds to the protection interface. If it is determined that the release signal corresponds to the protection interface, the terminal device acquires the start parameter of the application program from the protection parameter.

For example, after the user inputs the pattern shown in FIG. 6, the terminal device determines whether the pattern corresponds to the protection interface; and after determining that the pattern corresponds to the protection interface, the terminal device acquires start information of the application program from the protection parameter.

In step 711, the application program is started based on the start parameter of the application program.

The terminal device starts the application program to be started based on the start parameter of the application program.

For example, after receiving the pattern input by the user as shown in FIG. 6, the terminal device releases the protection interface, starts the "X Lei Player" based on start information of the application program, and displays play interface of the "X Lei Player".

It is to be noted that, if the determined result of step 703 is that the application program is not in the protection list, or the determined result of step 704 is that the application program does not satisfy the preset condition, then the step of acquiring start information of the application program based on the protection parameter and starting the application program based on the start information is directly performed.

In sum, according to the method for protecting the application program provided by an embodiment of the present disclosure, the application program is well protected by intercepting a request for starting an application program, parsing the start parameter in the start request to determine the application program, determining that the application program needs protection if the application program is queried in the protection list, determining whether the application program satisfies the preset condition before determining that the application program needs protection, determining that the application program needs protection if the application program satisfies the preset condition, creating protection parameter based on start parameter of the application program, and starting the application program after receiving a release signal corresponding to the protection interface.

Accordingly, the present disclosure solves the following problem: that the protected application program has already been running when the protection interface is started, thereby information in the protected application program might be leaked by ways of playing sound or the like is solved. Therefore, the present disclosure achieves the technical effects of directly starting a protection interface before starting the application program when determining that the application program to be started needs protection, and starting the application program only after the protection interface is released, thereby to protect information of the application program comprehensively and thoroughly.

The present embodiment determines whether to start the protection interface by determining whether the application program satisfies the preset condition after determining that the application program is in the protection list, so as to achieve the effect that when the user needs to start a certain application program frequently, the user just needs to input the release signal once while not having to input the release signal each time.

Figure 9:
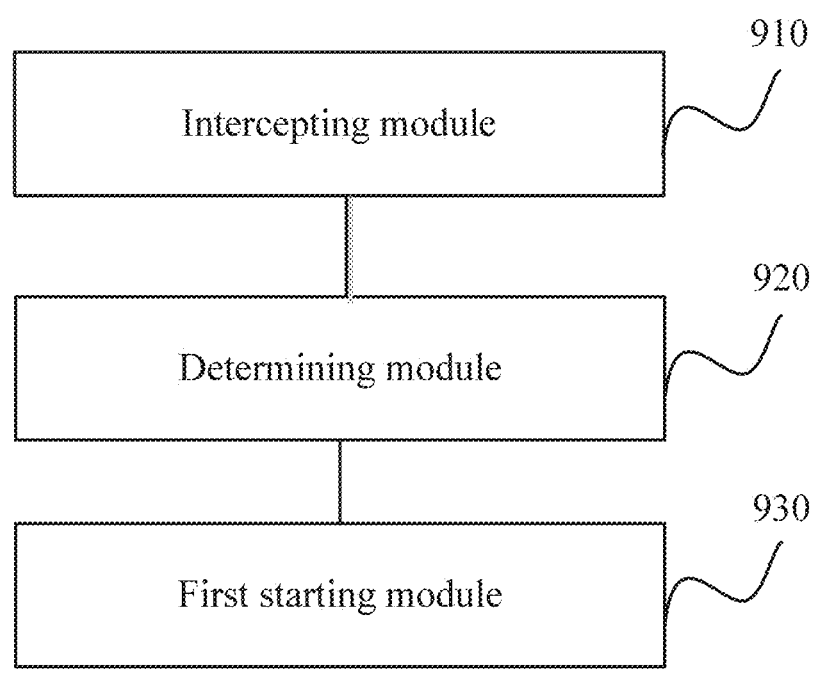
FIG. 9 is a block diagram collectively illustrating an apparatus for protecting an application program, according to an exemplary embodiment of the present disclosure.

Referring to FIG. 9, which is a block diagram illustrating an apparatus for protecting an application program provided by an exemplary embodiment of the present disclosure. In this case, the apparatus for protecting the application program may be implemented as entirety or part of a terminal device by software, hardware or a combination thereof.

The apparatus for protecting the application program may include: an intercepting module 910 configured to intercept a request for starting an application program; a determining module 920 configured to determine whether the application program to be started needs protection; and a first starting module 930 configured to start a protection interface before starting the application program if the determining module 920 determines that the application program needs protection.

Figure 10:
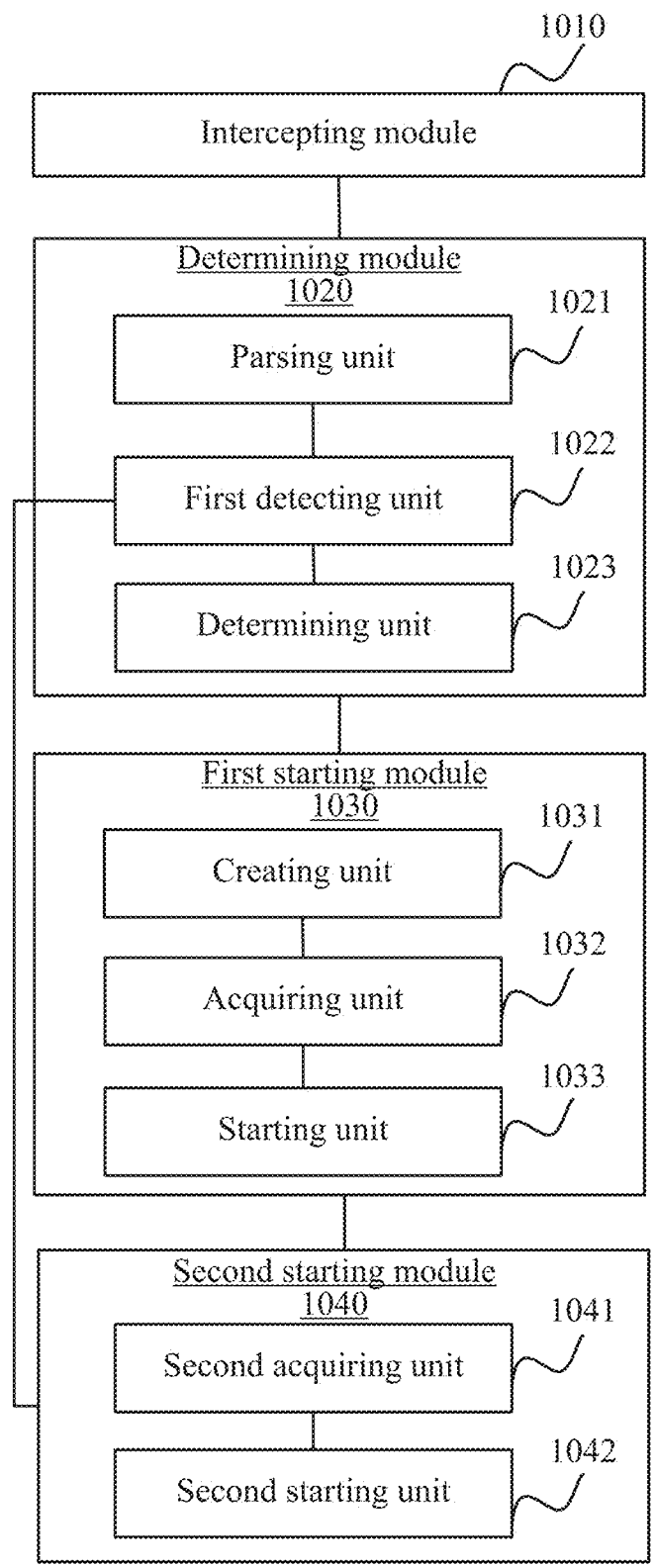
FIG. 10 is a block diagram illustrating an apparatus for protecting an application program, according to an exemplary embodiment of the present disclosure.

Referring to FIG. 10, which is a block diagram illustrating an apparatus for protecting an application program provided by another exemplary embodiment of the present disclosure. Herein, the apparatus for protecting the application program may be implemented as entirety or part of a terminal device by software, hardware or a combination thereof. The apparatus for protecting the application program may include: an intercepting module 1010 configured to intercept a request for starting an application program; and a determining module 1020 configured to determine whether the application program to be started needs protection.

Alternatively, the determining module 1020 includes: a parsing unit 1021 configured to parse the request to obtain the start parameter of the application program, the start parameter of the application program including the name of the application program; a first detecting unit 1022 configured to determine whether the application program is in a protection list based on the name of the application program parsed by the parsing unit 1021, the protection list being a list of application programs to be protected; and a determining unit 1023 configured to determine that the application program needs protection when the determined result of the first detecting unit 1022 is that the application program is in the protection list.

The apparatus for protecting the application program may further include a first starting module 1030 configured to start a protection interface when the determining module 1020 determines that the application program needs protection.

Alternatively, the first starting module 1030 includes: a creating unit 1031 configured to create the protection parameter based on the start parameter of the application program and predefined start parameter for configuring protection interfaces; an acquiring unit 1032 configured to acquire start parameter of the protection interface based on the protection parameter created by the creating unit 1031; and a starting unit 1033 configured to start the protection interface based on the start parameter of the protection interface acquired by the acquiring unit 1032.

The apparatus for protecting the application program may further include a second starting module 1040 configured to start the application program upon receiving a release signal corresponding to the protection interface started by the first starting module 1030.

Alternatively, the second starting module 1040 includes: a second acquiring unit 1041 configured to acquire start information of the application program based on the start parameter in the protection request upon receiving the release signal corresponding to the protection interface; and a second starting unit 1042 configured to start the application program based on the start information of the application program acquired by the second acquiring unit.

Figure 11:
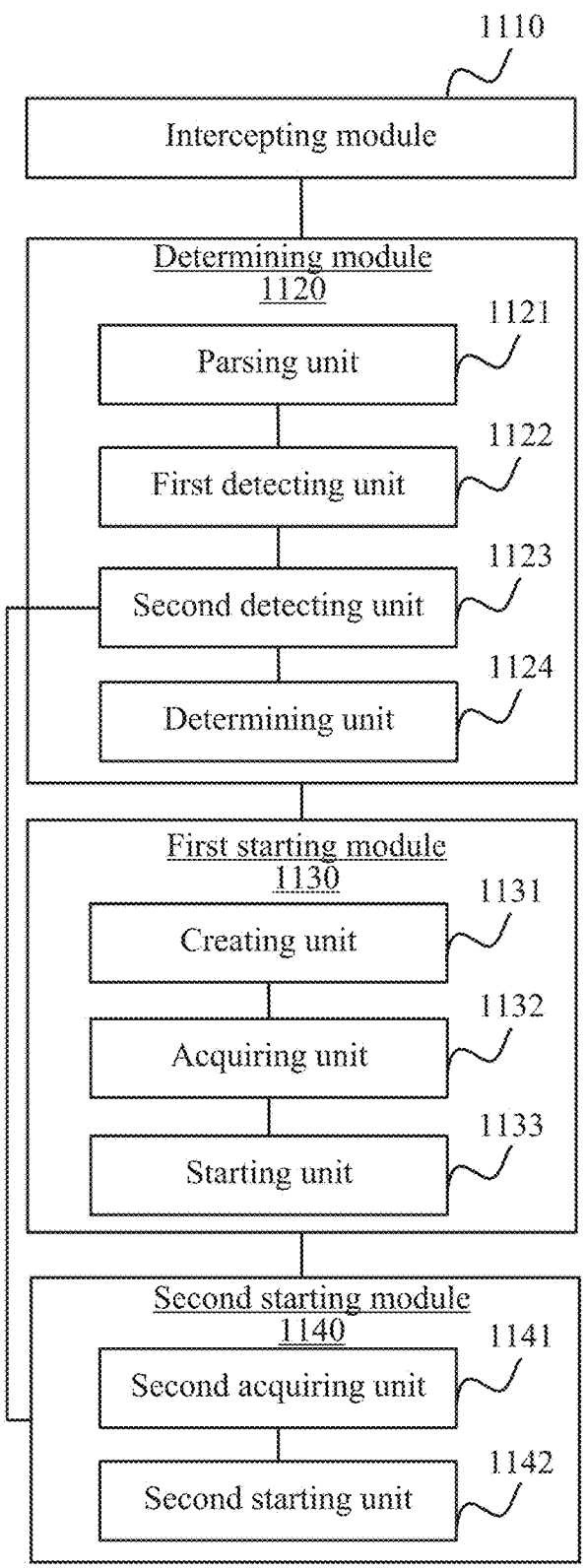
FIG. 11 is a block diagram illustrating an apparatus for protecting an application program, according to an exemplary embodiment of the present disclosure.

Please refer to FIG. 11, which is a block diagram illustrating an apparatus for protecting an application program provided by another exemplary embodiment of the present disclosure. Herein, the apparatus for protecting the application program may be implemented as entirety or part of a terminal by software, hardware or a combination thereof.

The apparatus for protecting the application program may include: an intercepting module 1110 configured to intercept a request for starting an application program; and a determining module 1120 configured to determine whether the application program to be started needs protection.

Alternatively, the determining module 1120 includes: a parsing unit 1121 configured to parse the start request to obtain the start parameter of the application program, the start parameter of the application program including the name of the application program; a first detecting unit 1122 configured to determine whether the application program is in a protection list based on the name of the application program parsed by the parsing unit 1121, the protection list being a list of application programs to be protected; and a second detecting unit 1123 configured to determine whether the application program satisfies a preset condition when the determined result of the first detecting unit 1122 is that the application program is in the protection list.

The preset condition includes any one of the followings: 1) the application program has never been started; 2) after last start of the application program, a screen of a terminal device on which the application program runs has been turned off; 3) after the last start of the application program, the terminal device on which the application program runs has been restarted; and 4) a time interval between the last start and current start of the application program exceeds a preset value.

A determining unit 1124 is configured to determine that the application program needs protection when the determined result of the second detecting unit 1123 is that the application program satisfies the preset condition.

The apparatus for protecting the application program may further include a first starting module 1130 configured to start a protection interface when the determining module 1120 determines that the application program needs protection.

Alternatively, the first starting module 1130 includes: a creating unit 1131 configured to create the protection parameter based on the start parameter of the application program and predefined start parameter for configuring protection interfaces; an acquiring unit 1132 configured to acquire start parameter of the protection interface based on the protection parameter created by the creating unit 1131; and a starting unit 1133 configured to start the protection interface based on the start parameter of the protection interface acquired by the acquiring unit 1132.

The apparatus for protecting the application program may further include a second starting module 1140 configured to start the application program upon receiving a release signal corresponding to the protection interface started by the first starting module 1130.

Alternatively, the second starting module 1140 includes: a second acquiring unit 1141 configured to acquire start parameter of the application program based on the protection parameter upon receiving the release signal corresponding to the protection interface; and a second starting unit 1142 configured to start the application program based on the start parameter of the application program acquired by the second acquiring unit 1141.

The present embodiment determines whether to start the protection interface by detecting whether the application program satisfies the preset condition after detecting that the application program is in the protection list, so as to achieve the effect that when the user needs to start a certain application program frequently, the user just needs to input the release signal once while not having to input the release signal each time.

Figure 12:
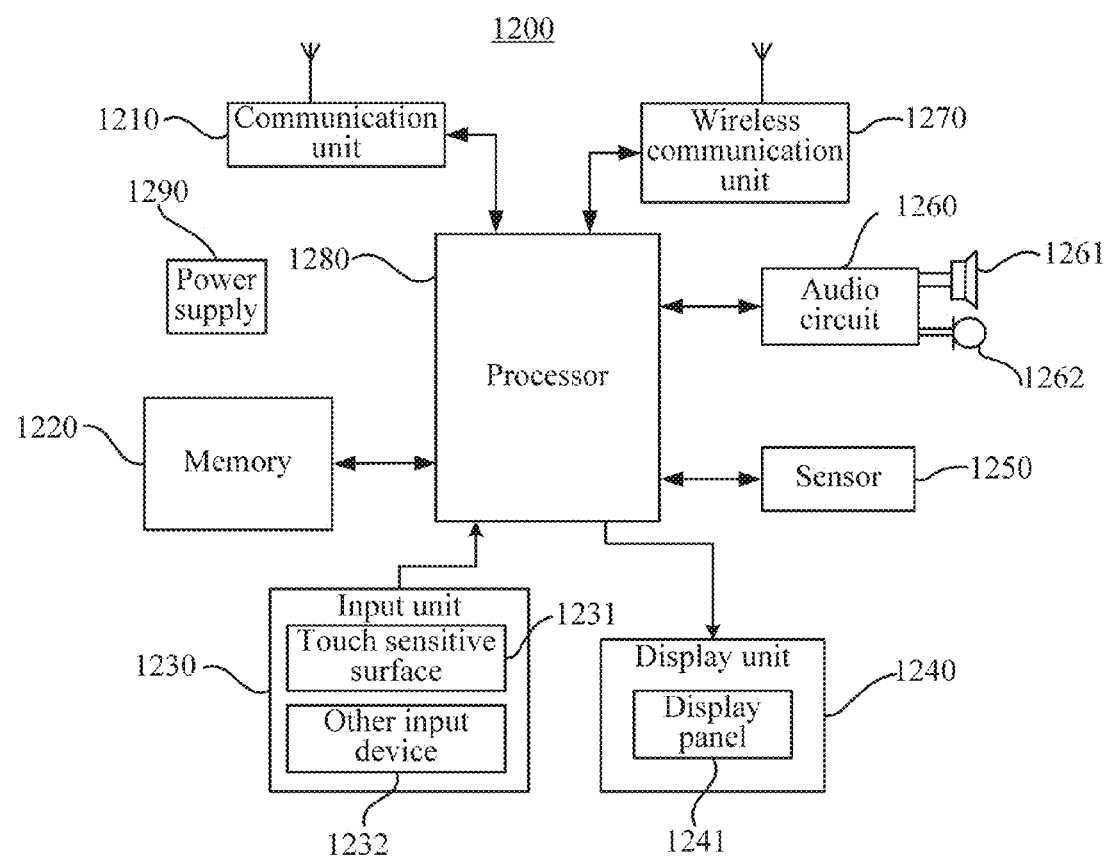
FIG. 12 is a block diagram illustrating a terminal device, according to an exemplary embodiment of the present disclosure.

Referring to FIG. 12, which is a block diagram illustrating a terminal device provided by an exemplary embodiment of the present disclosure, the terminal device may be configured to perform the methods for protecting the application program provided in the above embodiments.

The terminal device 1200 may include a communication unit 1210, a memory 1220 including one or more computer-readable storage media, an input unit 1230, a display unit 1240, a sensor 1250, an audio circuit 1260, a WIFI (Wireless Fidelity) module 1270, a processor 1280 including one or more processing cores, a power supply 1290 and other components. It should be appreciated by those skilled in the art that, the structure of the terminal shown in the figure does not constitute a limitation to the terminal device, and it may include more or less components than what is illustrated, or combine some of the components, or have different component arrangements.

The communication unit 1210 may be configured to transmit and receive information, or to transmit and receive signal during a procedure of calling. The communication unit 1210 may be a network communication device such as a RF (Radio Frequency) circuit, a router, and a modem. In particular, when the communication unit 1210 is a RF circuit, the communication unit 1210 receives downlink information from a base station, and then transfers the information to one or more processors 1280 to be processed. Also, the communication unit 1210 transmits uplink data to the base station. Generally, the RF circuit as a communication unit includes but not limited to an antenna, at least one amplifier, a tuner, one or more oscillators, a subscriber identity module (SIM) card, a transceiver, a coupler, an LNA (Low Noise Amplifier), a duplexer, etc. Furthermore, the communication unit 1210 may communicate with a network and other apparatuses through wireless communication. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc. The memory 1220 may be configured to store software programs and instruction modules. The processor 1280 performs various functional applications and data processing by running the software programs and instruction modules stored in the memory 1220. The memory 1220 may mainly include a program storage area and a data storage area, wherein the program storage area may store operating systems, application programs required by at least one function (such as a function of sound playback, and a function of image playback), etc.; and the data storage area may store data created during operation of the terminal 1200 (such as an audio data, or a phone book), etc. In addition, the memory 1220 may include a high-speed random access memory and may also include a non-volatile memory. For example, the memory 1220 may include at least one disk storage device, a flash memory device, or other volatile solid-state memory devices. Accordingly, the memory 1220 may also include a memory controller to provide the processor 1280 and the input unit 1230 with an access to the memory 1220.

The input unit 1230 may be configured to receive information of input numbers or characters, and generate signal inputs from a keyboard, a mouse, a joystick, an optical or trackball related to a user setting and the functional control. Optionally, the input unit 1230 may include a touch sensitive surface 1231 and other input device 1232. The touch sensitive surface 1231, also known as a touch screen or a track pad, may collect user's touch operations on or near the touch sensitive surface 1231 (such as an operation performed by users using any suitable object or accessory such as a finger, a touch pen and the like on or near the touch sensitive surface 1231), and drive a corresponding connected device according to a preset program. Optionally, the touch sensitive surface 1231 may include two parts of a touch detection device and a touch controller. Here, the touch detection device detects a touching position of the user, detects a signal caused by the touch operation, and transmits the signal to the touch controller. The touch controller receives touch information from the touch detection device, transforms it into coordinates of the touch point, and sends the coordinates to the processor 1280. The touch controller may also receive a command from the processor 1280 and execute the command. In addition, the touch sensitive surface 1231 may be realized in various types, such as resistive type, capacitive type, infrared type and surface acoustic wave type. In addition to the touch sensitive surface 1231, the input unit 1230 may also include other input device 1232. Preferably, the other input device 1232 may include but not limited to one or more of a physical keyboard, functional keys (such as volume control keys, and switch buttons), a trackball, a mouse, and a joystick.

The display unit 1240 may be configured to display information input by the user or information provided to the user and various graphical user interfaces of the terminal 1200. These graphical user interfaces may consist of graphics, texts, source display frames, videos, and any combination thereof. The display unit 1240 may include a display panel 1241, and optionally, the display panel 1241 may be configured with LCD (Liquid Crystal Display), OLED (Organic Light-Emitting Diode), etc. Optionally, the touch sensitive surface 1231 may cover the display panel 1241. When a touch operation on or near the touch sensitive surface 1231 is detected by the touch sensitive surface 1231, the touch operation is sent to the processor 1280 to determine the type of touch event, and then corresponding visual output will be provided on the display panel 1241 by the processor 1280 according to the type of touch event. Although in FIG. 12, the touch sensitive surface 1231 and the display panel 1241 are two separate components to realize input and output functions, in some embodiments, the touch sensitive surface 1231 and the display panel 1241 may be integrated to realize input and output functions.

The terminal device 1200 may further include at least one kind of sensor 1250, such as a light sensor, a motion sensor and other sensors. The light sensor may include an ambient light sensor and a proximity sensor. Here, the ambient light sensor may adjust the brightness of the display panel 1241 according to the brightness of the ambient light. The proximity sensor may turn off the display panel 1241 and/or backlight when the terminal 1200 moves close to ear. As one kind of the motion sensor, a gravity acceleration sensor may detect the magnitude of acceleration in each direction (typically on three axes), and may detect the magnitude and the direction of gravity when it is stationary, which may be used in the applications for recognizing the attitudes of the mobile phone (such as horizontal and vertical screen switching, related games, attitude calibration of a magnetometer), functions related to vibration recognizing (such as a pedometer, clicking), etc. The terminal 1200 may also be equipped with other sensors such as a gyroscope, a barometer, a hygrometer, a thermometer, and an infrared sensor, which will not be redundantly described herein.

The audio circuit 1260, a speaker 1261 and a microphone 1262 may provide an audio interface between the user and the terminal device 1200. The audio circuit 1260 may transform received audio data into electrical signals which are transmitted to the speaker 1261 and transformed into sound signals to be output by the speaker 1261. On the other hand, the microphone 1262 transforms collected sound signals into electrical signals which are received and transformed into audio data by the audio circuit 1260. After being output to the processor 1280 to be processed, the audio data is transmitted to, for example, another terminal apparatus via the RF circuit 1210, or output to the memory 1220 for further processing. The audio circuit 1260 may also include an earplug jack to allow a communication between an external earphone and the terminal 1200.

In order to achieve wireless communication, the terminal may be equipped with a wireless communication unit 1270 which may be a WIFI module. WIFI belongs to a short-range wireless transmission technology. The terminal 1200 allows the user to send and receive emails, browse web-pages and access streaming media, etc. through the wireless communication unit 1270, which provides the user with a wireless broadband Internet access. Although FIG. 12 shows the wireless communication unit 1270, it should be understood that, the wireless communication unit 1270 is not a necessary component of the terminal 1200, and may be omitted as desired without changing the essential scope of the disclosure.

The processor 1280 is a control center of the terminal device 1200 that connects various parts of the entire mobile phone through various interfaces and circuits, performs various functions and data processing of the terminal device 1200 by running or executing the software programs and/or instruction modules stored in the memory 1220 and by invoking data stored in the memory 1220, so as to monitor the overall mobile phone. Optionally, the processor 1280 may include one or more processing cores. Optionally, the processor 1280 may be integrated with an application processor that mainly processes operating systems, user interfaces and application programs, and a modem processor that mainly processes the wireless communication. It should be understood that, the above modem processor may not be integrated into the processor 1280.

The terminal device 1200 may also include a power supply 1290 (such as a battery) to supply power to each component. Optionally, the power supply may be logically connected to the processor 1280 through a power supply management system, so as to achieve the functions such as charge, discharge and power consumption managements through the power supply management system. The power supply 1290 may also include one or more components of a DC or AC power, a recharge system, a power failure detection circuit, a power converter or an inverter, a power status indicator, etc.

Although not shown, the terminal device 1200 may also include a camera, a Bluetooth module, etc., which are not redundantly described herein.

In the present embodiment, the memory 1220 stores one or more instruction modules, which are configured to be executed by the one or more processors 1280, wherein, the one or more instruction modules have the following functions: intercepting a request for starting an application program; determining whether the application program needs protection; and starting a protection interface before starting the application program, if the application program needs protection. In some exemplary embodiments, the memory may further include one or more instruction modules further configured to execute steps described in the above FIG. 2-3 and FIG. 7.

The embodiment of the present disclosure further provides a nonvolatile readable storage medium in which one or more instruction modules (programs) are stored to execute instructions for the following steps: intercepting a request for starting an application program; determining whether the application program needs protection; and starting a protection interface before starting the application program, if the application program needs protection. In some exemplary embodiments, the storage medium may further include one or more instruction modules further configured to execute steps described in the above FIG. 2-3 and FIG. 7.

Although the exemplary embodiments of the present disclosure are illustrated in the above contents, it should be noted that various changes and modifications may be made to the disclosed exemplary embodiments without departing from the scope of the present disclosure as defined in the claims. The functions, steps and/or actions in the method claims according to the disclosed embodiments described herein need not be performed in any specific order. In addition, although the elements of the present disclosure may be described or claimed in the individual form, they can also be conceived to be more unless they are explicitly restricted to be singular.

The objects, technical solutions and advantageous effects of the present disclosure have been explained in more detail with the above specific embodiments. It should be appreciated that, the above contents are merely specific embodiments of the present disclosure, and are not used to limit the scope of the present disclosure. Any alteration, equivalent replacement, modification and the like within the spirit and principle of the present disclosure should be embraced in the protection scope of the present disclosure.

What is claimed is:

1. A method for protecting an application program operated by a terminal device on which the application program runs, comprising:
    intercepting a request for starting an application program;
    parsing the request to obtain a start parameter of the application program, the start parameter of the application program comprising the name of the application program;
    determining whether the application program is in the protection list based on the obtained start parameter;
    determining whether the application program satisfies a preset condition in response to determining that the application program is in the protection list;
    displaying a protection interface before starting the application program in response to determining that the preset condition is satisfied; and
    starting the application program upon receiving a release signal corresponding to the protection interface;
    wherein the preset condition is satisfied when the application program has never been started; and
    the preset condition is satisfied when a screen of the terminal device on which the application program runs has been turned off since the last start of the application program.

2. The method of claim 1, wherein the start parameter comprises the name of the application program.

3. The method of claim 1, wherein the preset condition is satisfied when the terminal device on which the application program runs has been restarted since the last start of the application program.

4. The method of claim 1, wherein the preset condition is satisfied when the time interval between the last start and current start of the application program exceeds a preset value.

5. The method of claim 1, wherein displaying the protection interface comprises:
    creating a protection parameter based on the start parameter of the application program and predefined start parameter for configuring protection interfaces;
    acquiring the start parameter of the protection interface based on the protection parameter; and
    displaying the protection interface based on the acquired start parameter of the protection interface.

6. A terminal device, comprising: one or more processors; a memory; and one or more instruction modules stored in the memory comprising instructions executable by the one or more processors, the one or more processors configured for:
    intercepting a request for starting an application program;
    parsing the request to obtain a start parameter of the application program, the start parameter of the application program comprising the name of the application program;
    determining whether the application program is in the protection list based on the obtained start parameter;
    determining whether the application program satisfies a preset condition in response to determining that the application program is in the protection list;
    displaying a protection interface before starting the application program in response to determining that the preset condition is satisfied; and
    starting the application program upon receiving a release signal corresponding to the protection interface;
    wherein the preset condition is satisfied when the application program has never been started; and the preset condition is satisfied when a screen of the terminal device on which the application program runs has been turned off since the last start of the application program.

7. The terminal device of claim 6, wherein the start parameter comprises the name of the application program.

8. The terminal device of claim 6, wherein displaying the protection interface comprises:

creating a protection parameter based on the start parameter of the application program and start parameter predefined for configuring protection interfaces;

acquiring a start parameter of the protection interface based on the protection parameter; and displaying the protection interface based on the acquired start parameter of the protection interface.

9. A non-transitory readable storage medium including instructions, executable by a processor in a terminal device, for performing the method for protecting an application program, the method comprising:

intercepting a request for starting an application program;

parsing the request to obtain a start parameter of the application program, the start parameter of the application program comprising the name of the application program;

determining whether the application program is in the protection list based on the obtained start parameter;

determining whether the application program satisfies a preset condition in response to determining that the application program is in the protection list;

displaying a protection interface before starting the application program in response to determining that the preset condition is satisfied; and starting the application program upon receiving a release signal corresponding to the protection interface;

wherein the preset condition is satisfied when the application program has never been started; and the preset condition is satisfied when a screen of the terminal device on which the application program runs has been turned off since the last start of the application program.

* * * * *